Figure 1:
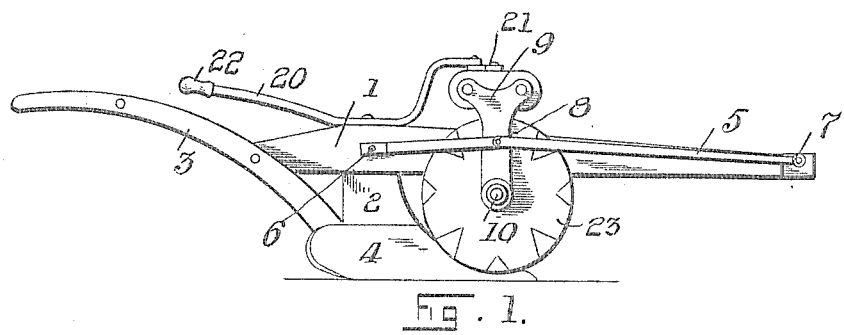

No. 804,554. PATENTED NOV. 14, 1905.
C. SCHARDT.
PLOW.
APPLICATION FILED JAN. 23, 1905.

Witnesses:

Inventor.
Christian Schardt.
by N. C. Evert & Co.
Attorneys.

UNITED STATES PATENT OFFICE.

CHRISTIAN SCHARDT, OF NORTH BRADDOCK, PENNSYLVANIA.

PLOW.

No. 804,554. Specification of Letters Patent. Patented Nov. 14, 1905.

Application filed January 23, 1905. Serial No. 242,352.

*To all whom it may concern:*

Be it known that I, CHRISTIAN SCHARDT, a citizen of the United States of America, residing at North Braddock, in the county of Allegheny and State of Pennsylvania, have invented certain new and useful Improvements in Plows, of which the following is a specification, reference being had therein to the accompanying drawings.

This invention relates to certain new and useful improvements in plows, and has for its object to combine a harrow and a plow whereby they may be simultaneously operated.

Another object of this invention is to provide the ordinary type of plow with a harrow attachment and means for governing the depth at which said harrow and plow are to engage the soil upon which they are being used.

Another object of this invention is to provide a combined harrow and plow which can be readily manipulated by the operator guiding the plow. The implement as constructed by me is extremely simple in construction, strong and durable, and comparatively inexpensive to manufacture.

With the above and other objects in view the invention consists in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 2:
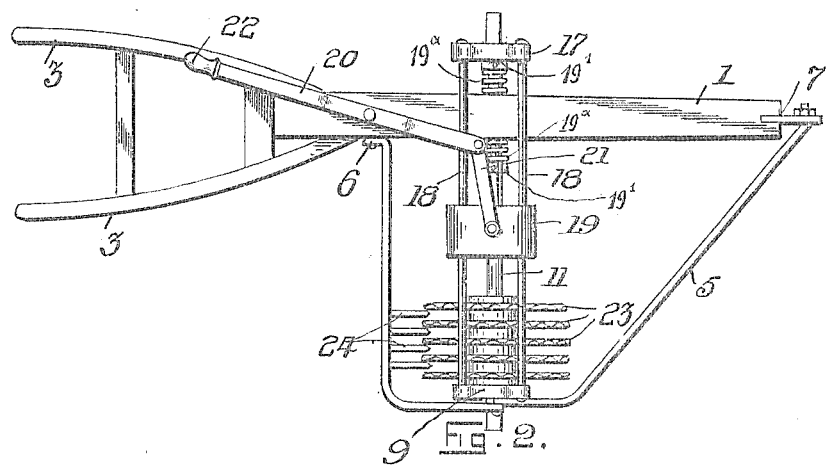
Figure 3:
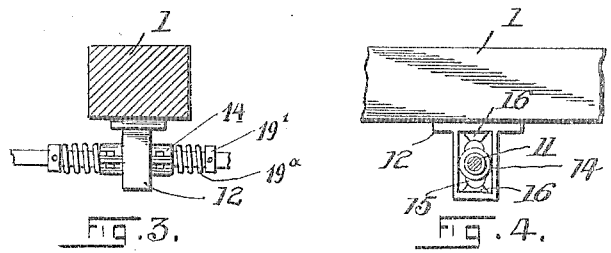
Figure 4:
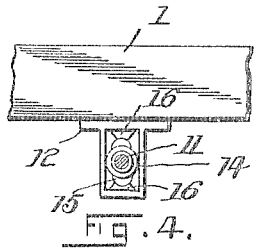

Figure 1 is a side elevation of my improved plow. Fig. 2 is a top plan view thereof. Fig. 3 is a cross-sectional view of the beam of the plow, illustrating a bearing-bracket carried thereby; and Fig. 4 is a side elevation view of the same.

To put my invention into practice, I have used a conventional form of plow which consists of a beam 1, a standard 2, handles 3, and a moldboard 4. My invention resides in providing this type of plow with a harrow attachment and means for regulating the depth at which the plow or harrow is to engage the soil in which it is being operated. The harrow attachment comprises an angular frame 5, the one end of which is pivotally secured to the side of the beam directly above the standard 2, as indicated at 6, while the other end of said frame is pivotally secured to the forward end of the beam, as indicated at 7. This end of the frame may be secured to the ordinary type of clevis, (not shown,) which is ordinarily secured to the forward end of the plow, whereby a horse or a team of horses may be attached to said plow. The frame 5 has pivotally secured to its outer end, as indicated at 8, a substantially T-shaped bracket 9, the frame 5 being made in two sections and the two sections being pivotally attached together at the point of attachment of the bracket 9, and between the lower end 10 of said bracket and the beam 1 is mounted a shaft 11. This shaft is supported directly beneath the beam by a bracket-bearing 12. (Illustrated in Figs. 3 and 4 of the drawings.) In the bracket-bearing 12 is mounted a collar 14, in which the shaft 11 is loosely supported. The collar is provided with convexed rocker members 15, which are adapted to bear against and seat in concave rocker members 16 16, carried by the bracket 12. This form of bearing is provided, whereby the shaft will be swiveled in the bracket-bearing 12 and the outer end thereof permitted to rise and lower, according to the character of work being performed by my improved implement. The shaft 11 protrudes through said bearing 12 and is provided adjacent to its end with a substantially T-shaped bracket 17, similar in construction to the bracket 9. Between the upper outwardly-extending portions of said bracket are mounted rods 18 18, and upon said rods is slidably mounted a weight 19. The shaft 11 protrudes a short distance beyond the brackets 9 and 17, and this shaft, upon each side of the bracket 12, is provided with collars 19'. Between the collars and the collar 14 heretofore described are mounted springs 19$^a$. These springs are adapted to return the shaft 11 to its normal position should the shaft during the operation of the implement become displaced. This may occur by the implement striking a rock or root, which would cause the shaft to be moved within the collar 14.

The beam 1 directly above the standard 2 is provided with a pivoted lever 20, the one end of which is connected by a link 21 to the weight 19, while the rearwardly-extending end of said lever is provided with a handle 22.

Journaled upon the shaft 11, near the frame 5, are a plurality of cutter-wheels 23, which are mounted in close proximity to one another. These wheels may be of the ordinary type of harrow-disks which are commonly employed for cutting, breaking, and thoroughly agitating soil over which they are passed. The frame 5 is provided with a plurality of bars 24, each bar extending a short distance between the cutter-wheels 23 to prevent the wheels from becoming clogged during their use.

By slidably mounting the weight 19 upon the rods 18 18 of the implement I have provided means for regulating the depth at which the harrow and the plow are to enter the soil over which they are being worked, it being observed that when the weight is shifted upon the harrow end of the implement by the operator manipulating the lever 20 the harrow will agitate the soil at a greater depth than if the weight were shifted to the opposite side of the implement, and by this means the depth at which the plow is to enter the soil can also be regulated.

By the shifting of the weight carried by the implement the operator is relieved from exerting any pressure upon either of the handles of the implement, the weight being adjusted to regulate either the plow or harrow at the depth desired and according to the nature of the soil.

While I have herein shown the preferred manner of constructing my improved implement, it will of course be understood that various changes may be made in the details of construction without departing from the general spirit and scope of the invention.

What I claim, and desire to secure by Letters Patent, is—

1. In an implement of the type described the combination with a plow having a beam, of a harrow attached to the beam of said plow, said harrow consisting of a shaft pivoted on the plow-beam and a plurality of cutter-disks mounted on the shaft, a frame pivotally attached to the plow-beam and supporting the outer end of the shaft, and means to regulate the depth to which said disks engage the soil, substantially as described.

2. In an implement of the type described, the combination with a plow, of a shaft pivoted to the beam of said plow, brackets carried by said shaft, horizontally-arranged rods carried by said brackets, a weight slidably mounted on said rods and a lever pivotally attached to the plow-beam and connected to said weight.

3. In an implement of the type described, the combination with a plow, of a harrow, said harrow consisting of a frame carried by said plow, a shaft pivoted in said frame and the beam of said plow, cutter-disks journaled upon said shaft, a sliding weight mounted transversely of said frame, means to adjust said weight, and means to prevent said cutter-disks from becoming clogged, substantially as described.

In testimony whereof I affix my signature in the presence of two witnesses.

CHRISTIAN SCHARDT.

Witnesses:
H. C. EVERT,
K. H. BUTLER.